June 17, 1941.    R. OLSON    2,245,997
AUXILIARY FEED DEVICE FOR COMBINES
Filed Nov. 16, 1940
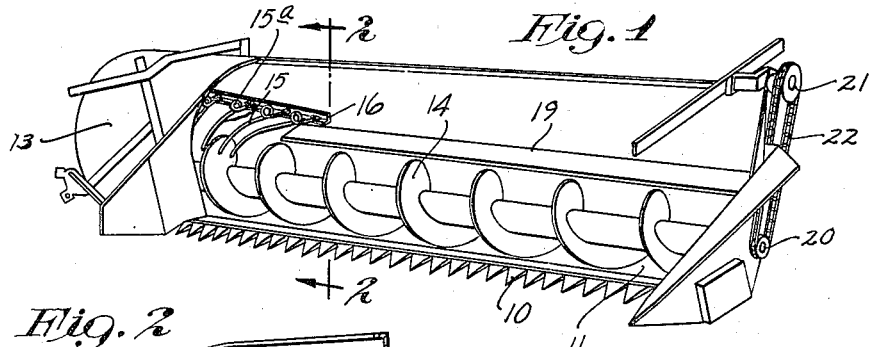
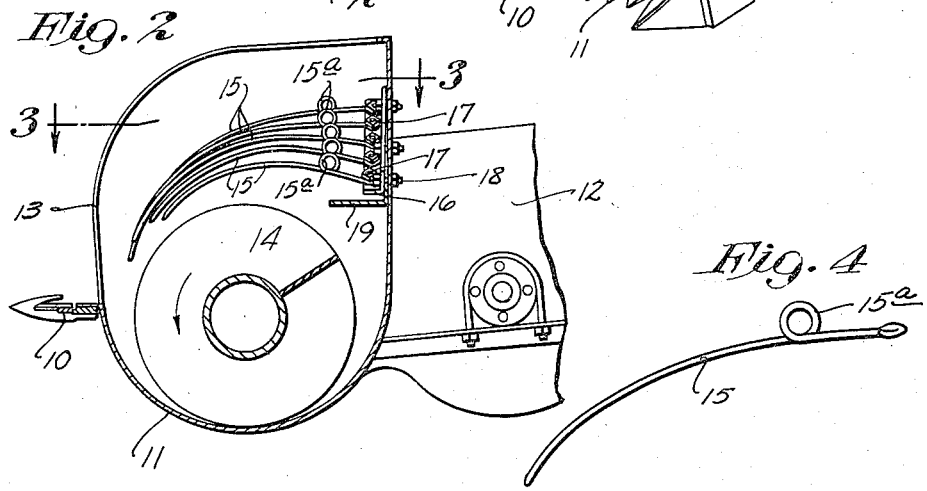
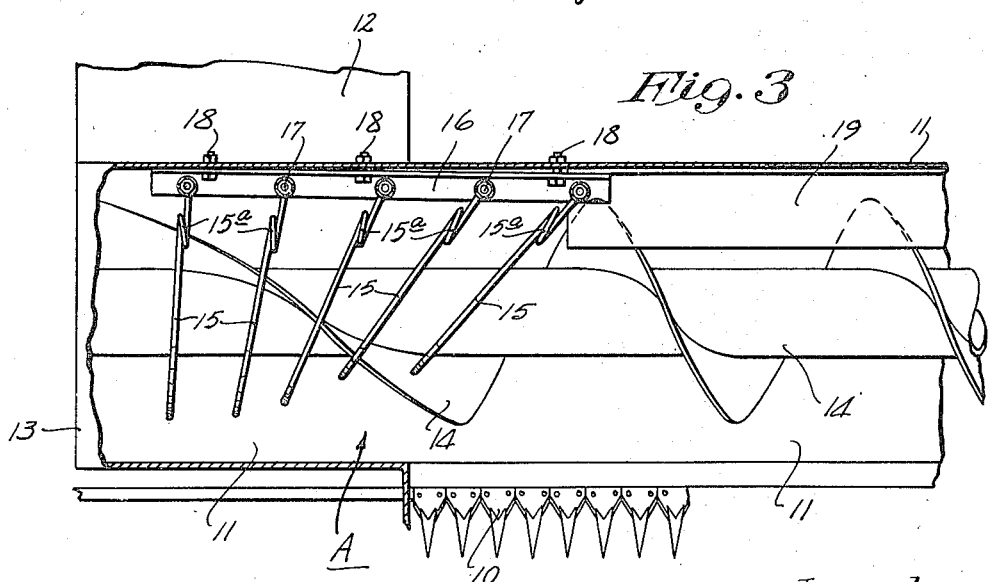
Inventor
Rudolph Olson
By his Attorneys
Merchant & Merchant Patented June 17, 1941

2,245,997

UNITED STATES PATENT OFFICE 2,245,997

AUXILIARY FEED DEVICE FOR COMBINES

Rudolph Olson, Sharon, N. Dak.

Application November 16, 1940, Serial No. 365,873

2 Claims. (Cl. 198—213)

This invention relates to machines of the so-called "combine type" wherein the cutting and the threshing of the grain is performed in the same machine. The combine known to the trade as the "Gleaner" manufactured and sold by the Gleaner Harvester Corporation, located at Independence, Missouri, is a machine of the type to which this invention relates.

In the said "Gleaner" combine and in various other combines, the grain cut under the advance movement of the machine is delivered into a large feed trough in which is a spiral conveyor that delivers the cut grain from one end of the trough into the chamber or casing in which the threshing mechanism is located. Said trough opens into the thresher casing through an opening that is considerably larger than the diameter of the spiral conveyor and, in practice, it has been found that very frequently the cut grain will pile up at the entrance into the thresher casing or compartment and will clog the feed mechanism and delay operation of the machine until the clogged material is manually picked or dug out of the entrance to the casing of the threshing mechanism.

My invention provides a very simple and highly efficient auxiliary device that will prevent the above noted clogging. This auxiliary device involves a plurality of curved spring fingers or tines secured to and projected from the rear wall of the feed trough in a novel relative arrangement, and overlying that portion of the feed trough a spiral conveyor that extends from the cutting mechanism through or at least into the casing of the threshing mechanism.

The preferred arrangement of this auxiliary device is illustrated in the accompanying drawing wherein like characters indicate like parts throughout the several views.

Referring to the drawing:

Fig. 1 is a view in perspective showing the cutting mechanism, the feed trough, the spiral conveyor, and the casing of the threshing mechanism and immediately connected parts removed from the complete machine or combine;

Fig. 2 is a vertical section taken from front to rear on the line 2—2 of Fig. 1;

Fig. 3 is a horizontal section taken approximately on the line 3—3 of Fig. 2, various parts being broken away; and Fig. 4 is a detail in side elevation showing one of the spring fingers or tines of the auxiliary device.

Of the parts of the combine, insofar as they are illustrated in the drawing, 10 indicates the customary cutting mechanism consisting of a finger bar and sickle which is operated in the well-known way and is positioned so that the cut grain, usually under the action of a reel, not shown, will be delivered into the large feed trough 11. This feed trough 11 is shown as supported by a member 12 that is a part of the framework of the combine. The trough 11 delivers into and, in fact, forms a part of the bottom of the casing 13 in which the customary threshing cylinder is arranged to work in a manner well understood by all those familiar with the said "Gleaner" combine or with machines of that general character.

Working within the feed trough 11 is the customary spiral conveyor 14 that is mounted and power-driven in the well-known manner. In the operation of machines of the character just briefly described, the clogging of the grain will be approximately at the place marked A on Fig. 3 and this clogging is caused by the fact that the cut grain delivered into the trough will pile up and will not be pressed down into complete and good contact with the spiral conveyor.

The auxiliary attachment above referred to involves a multiplicity of curved spring fingers or tines 15 that are rigidly secured to an anchoring bar 16 preferably by nut-equipped bolts 17 that make the said fingers or tines angularly adjustable in respect to the axis of the spiral conveyor and of the feed trough. The anchor bar 16, as shown, and preferably, is an angle bar which is rigidly secured to the rear wall of the feed trough by means of nut-equipped bolts 18 or the like. This bar 16, for a purpose which will presently appear, is inclined in a direction from the entrance to the casing 13 toward the receiving end of the feed trough. Preferably, the rear wall of the feed trough, extending rearward from the anchoring bar 16, has an inwardly projecting flange 19. In the preferred arrangement the spring fingers or tines 15 are formed with intermediate loops 15a that increase the resilience thereof. It is important to note that the spring fingers 15 are progressively longer and longer, that their free ends are progressively higher and higher, and that the said fingers have progressively decreasing angularity in respect to the axis of the conveyor 14 in a direction in which the material is fed from the trough into the thresher casing.

The cut grain that falls onto the first finger 15 wil lhave a chance to work its way under the second finger and so on throughout the series of fingers or tines. These spring tines will, of course, yield under pressure of the grain, but will constantly exert force tending to pack or press the cut grain into contact with the spiral conveyor so that the above noted clogging action will be prevented and the feeding action of the spiral conveyor will be increased to a maximum and the final delivery of the cut grain into the thresher casing will be accomplished without clogging.

No attempt has been made in the drawing to illustrate those features well-known in combines of the character above referred to which do not particularly relate to the applicant's invention. However, in Fig. 1, one end of the shaft of the spiral conveyor is shown as provided with a sprocket 20 that is driven through another sprocket 21 through a sprocket chain 22. The means for driving the sprocket 21 is not illustrated nor is further illustration thereof necessary or desirable for the purposes of this case.

What I claim is:

1. In a machine of the kind described, a casing having an inlet at one side, a trough, one end of which leads to the inlet of said casing, a rotary feed screw working in said trough and extended to said inlet passage for the delivery of material into said casing, in combination with a multiplicity of resilient fingers supported from the rear wall of said trough and spaced over said feed screw along the point of entry of the stock from said spout into said casing, said resilient fingers being set obliquely in respect to the line of the feed of the material.

2. In a machine of the kind described, a casing having an inlet at one side, a trough, one end of which leads to the inlet of said casing, a rotary feed screw working in said trough and extended to said inlet passage for the delivery of material into said casing, in combination with a multiplicity of resilient fingers supported from the rear wall of said trough and spaced over said feed screw along the point of entry of the stock from said spout into said casing, said resilient fingers being set obliquely in respect to the line of the feed of the material, and at progressively decreasing angle to the axis of said feed screw in the direction of the feed.

RUDOLPH OLSON.